US012606189B2

(12) United States Patent
Chicklore Mahesh et al.

(10) Patent No.: US 12,606,189 B2
(45) Date of Patent: Apr. 21, 2026

(54) METHODS AND SYSTEMS FOR THREAT DETECTION IN VEHICLES

(71) Applicant: ZF Friedrichshafen AG, Friedrichshafen (DE)

(72) Inventors: Deepashree Chicklore Mahesh, Troy, MI (US); Max Himmel, Ann Arbor, MI (US); Kalash Jain, Bloomfield Hills, MI (US); Tammer Jarjoura, Grosse Pointe Farms, MI (US); Matthew Jazwiecki, Canton, MI (US); Mark Lundgren, Northville, MI (US); Pulkit Monga, Westland, MI (US); Srinivas Mysore, Novi, MI (US); David Wilson, Milford, MI (US); Grigory Yezersky, Farmington Hills, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 139 days.

(21) Appl. No.: 18/508,521

(22) Filed: Nov. 14, 2023

(65) Prior Publication Data

US 2025/0153727 A1     May 15, 2025

(51) Int. Cl.
| | |
|---|---|
| *B60Q 1/00* | (2006.01) |
| *B60W 30/09* | (2012.01) |
| *B60W 30/095* | (2012.01) |
| *B60W 50/14* | (2020.01) |

(52) U.S. Cl.
CPC ............ *B60W 50/14* (2013.01); *B60W 30/09* (2013.01); *B60W 30/0956* (2013.01); *B60W 2420/403* (2013.01); *B60W 2420/408* (2024.01); *B60W 2554/4046* (2020.02); *B60W 2556/10* (2020.02); *B60W 2556/40* (2020.02); *B60W 2556/45* (2020.02)

(58) Field of Classification Search
CPC .. B60W 50/14; B60W 30/09; B60W 30/0956; B60W 2420/403; B60W 2420/408; B60W 2554/4046; B60W 2556/10; B60W 2556/40; B60W 2556/45
See application file for complete search history.

(56) References Cited

U.S. PATENT DOCUMENTS

| | | | | |
|---|---|---|---|---|
| 6,553,130 B1 * | 4/2003 | Lemelson | ............. | G01S 13/867 |
| | | | | 382/104 |
| 6,898,528 B2 * | 5/2005 | Zorka | .................... | G08G 1/163 |
| | | | | 701/45 |
| 11,242,051 B1 * | 2/2022 | Konrardy | ......... | G08G 1/096725 |
| 11,790,663 B2 * | 10/2023 | Pfeiffer | .................. | G08G 1/166 |
| 2010/0013615 A1 * | 1/2010 | Hebert | .................. | G06V 20/58 |
| | | | | 340/425.5 |
| 2010/0127841 A1 * | 5/2010 | D'Ambrosio | .......... | G08G 1/166 |
| | | | | 340/435 |
| 2025/0058770 A1 * | 2/2025 | Larsson | ............... | B60W 40/09 |

* cited by examiner

*Primary Examiner* — Toan N Pham
(74) *Attorney, Agent, or Firm* — Dority & Manning, P.A.

(57) ABSTRACT

A method for identifying hazardous conditions during vehicle operation includes: accessing data from a sensor corresponding to images of one or more other vehicles; computing, with a machine-learned model, a threat estimate for the one or more other vehicles based at least in part on the data from the sensor; and transmitting a threat alert to a driver interface of an ego vehicle.

18 Claims, 4 Drawing Sheets

400

ACCESS DATA CORRESPONDING TO IMAGES OF ONE OR MORE VEHICLES.          410

COMPUTE A THREAT ESTIMATE.          420

COMPUTE A THREAT REDUCTION ACTION.          430

TRANSMIT DATA CORRESPONDING TO A THREAT ALERT.          440

METHODS AND SYSTEMS FOR THREAT DETECTION IN VEHICLES

TECHNICAL FIELD

The present subject matter relates generally to systems and methods for threat detection in vehicles.

BACKGROUND

Various factors can contribute to vehicles accidents. Moreover, certain environmental conditions can pose an accident risk to a vehicle. The environmental conditions can include other vehicles, nearby objects, and other conditions outside of the driver's control that represent a significant risk for accidents.

A driver that recognizes environmental conditions can take mitigative action to reduce the accident risk posed by the environmental conditions. However, rapidly identifying and acting in response to the environmental conditions can be difficult for the driver. For instance, a driver may be facing forward when the risk-posing environmental condition is located to the side of the vehicle. As another example, the driver may be watching cars in front of the vehicle while an aggressive vehicle approaches a rear of the vehicle.

Accordingly, improved systems and methods for threat detection in vehicles would be useful. Moreover, systems and methods that identify threats for vehicle drivers would be useful.

BRIEF DESCRIPTION

In general, the present subject matter is directed to systems and methods for detecting threats to an ego vehicle. For instance, one or more sensors on the ego vehicle may be configured for capturing images of other vehicles operating nearby the vehicle. In an example arrangement, the sensors may include a camera (such as a front ADAS camera, a rear backup camera, or a side-view camera), a lidar sensor, a radar sensor, etc. that capture images of the other vehicles. A machine-learned model may analyze the images from the sensor to detect accident threats for the ego vehicle. For example, the machine-learned model may be trained to detect risky behavior by the other vehicle(s), such as aggressive driving, changing lanes without signal, cutting off, tailgating, dropping cargo, spinning out of control, inability to hold the lane, etc. When risky behavior is identified, a threat alert may also be presented on a driver interface of the ego vehicle to alert the driver to the risky behavior of the other vehicle(s). The driver of the ego vehicle may take mitigative action to avoid the other vehicle(s) and the accident threats presented by the other vehicle(s). Moreover, a threat reduction action for the ego vehicle may be determined as a response to the risky behavior. In example arrangements, the ego vehicle may automatically implement the threat reduction action in order to protect the driver of the ego vehicle and reduce the risk presented by the other vehicle(s).

Aspects and advantages of the disclosure will be set forth in part in the following description, or may be apparent from the description, or may be learned through practice.

In an example arrangement, a method for identifying hazardous conditions during vehicle operation includes accessing, with a computing device on an ego vehicle, data from a sensor corresponding to images of one or more other vehicles, computing, with a machine-learned model on the computing device, a threat estimate for the one or more other vehicles based at least in part on the data from the sensor, and transmitting, with the computing device, data corresponding to a threat alert to a driver interface of the ego vehicle.

In another example arrangement, a system for identifying hazardous conditions during vehicle operation includes an ego vehicle, a driver interface located on the ego vehicle, a sensor located on the ego vehicle, one or more processors located onboard the ego vehicle, and one or more non-transitory computer-readable media that store instructions that are executable by the one or more processors to perform operations. The operations include accessing data from the sensor corresponding to images of one or more other vehicles, computing, with a machine-learned model, a threat estimate for the one or more other vehicles based at least in part on the data from the sensor, and transmitting data corresponding to a threat alert to the driver interface.

These and other features, aspects and advantages of the present disclosure will become better understood with reference to the following description and appended claims. The accompanying drawings, which are incorporated in and constitute a part of this specification, illustrate example arrangements of the disclosure and, together with the description, serve to explain the principles of the disclosure.

BRIEF DESCRIPTION OF THE DRAWINGS

An enabling disclosure directed to one of ordinary skill in the art, is set forth in the specification, which makes reference to the appended figures.

DETAILED DESCRIPTION

Figure 1:
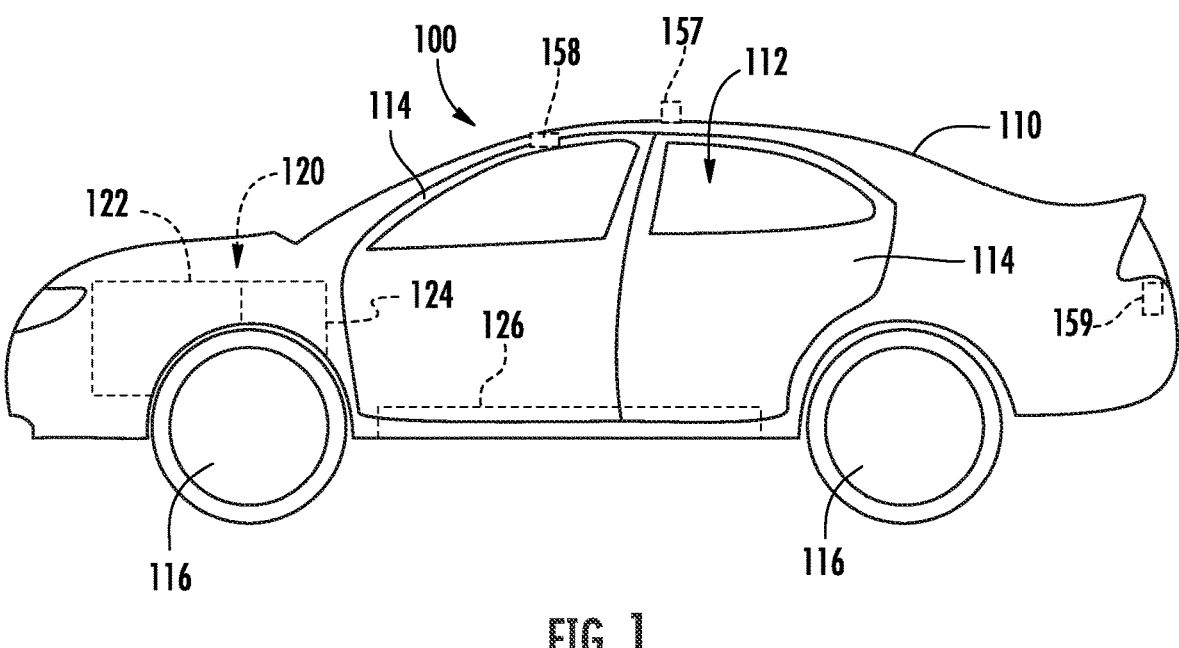
FIG. 1 is a side, elevation view of a passenger vehicle according to an example arrangement of the present subject matter.

Reference now will be made in detail to arrangements of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one arrangement can be used with another arrangement to yield a still further arrangement. Thus, it is intended that the present disclosure covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
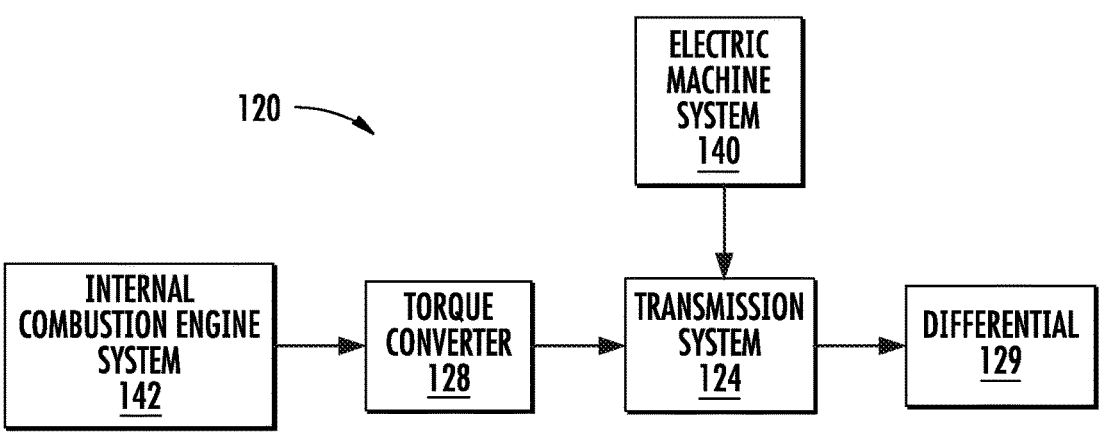
FIG. 2 is a schematic view of a drivetrain of the example vehicle of FIG. 1.

FIG. 1 is a side, elevation view of a passenger vehicle 100 according to an example arrangement. FIG. 2 is a schematic view of a drivetrain system 120 of passenger vehicle 100. As shown in FIG. 1, passenger vehicle 100 is illustrated as a sedan. However, passenger vehicle 100 in FIG. 1 is provided as an example only. For instance, passenger vehicle 100 may be a coupe, a convertible, a truck, a van, a sports utility vehicle, etc. in alternative example arrangements. In addition, while described below in the context of passenger vehicle 100, it will be understood that the present subject matter may be used in or with any other suitable vehicles, including commercial vehicles, such as tractor-trailers, busses, box trucks, farm vehicles, construction vehicles, etc., in other example arrangements.

Passenger vehicle 100 may include a body 110 that rolls on wheels 116 during driving of passenger vehicle 100. Body 110 that defines an interior cabin 112, and a driver and passengers may access interior cabin 112 via doors 114 and sit within interior cabin 112 on seats (not shown). Within body 110, passenger vehicle 100 may also include various systems, including a motor system 122, a transmission system 124, an electrical accumulator/storage system 126, etc., for operating passenger vehicle 100.

In general, motor system 122, transmission system 124, and electrical accumulator system 126 may be configured in any conventional manner. For example, motor system 122 may include prime movers, such as an electric machine system 140 and an internal combustion engine system 142 (FIG. 2), that are operatable to propel passenger vehicle 100. Thus, passenger vehicle 100 may be referred to as a hybrid vehicle. Motor system 122 may be disposed within body 110 and may be coupled to transmission system 124. Transmission system 124 is disposed within power flow between motor system 122 and wheels 116 of passenger vehicle 100. In certain example arrangements, a torque converter 128 may be disposed in the power flow between internal combustion engine system 142 and transmission system 124 within drivetrain system 120. Transmission system 124 is operative to provide various speed and torque ratios between an input and output of the transmission system 124. Thus, e.g., transmission system 124 may provide a mechanical advantage to assist propulsion of passenger vehicle 100 by motor system 122. A differential 129 may be provided between transmission system 124 and wheels 116 to couple transmission system 124 and wheels 116 while also allowing relative rotation between wheels 116 on opposite sides of body 110.

Electric machine system 140 may be selectively operable as either a motor to propel passenger vehicle 100 or as a generator to provide electrical power, e.g., to electrical accumulator system 126 and other electrical consumers of passenger vehicle 100. Thus, e.g., electric machine system 140 may operate as a motor in certain operating modes of passenger vehicle 100, and electric machine system 140 may operate as generator in other operating modes of passenger vehicle 100. Electric machine system 140 may disposed within drivetrain system 120 in various arrangements. For instance, electric machine system 140 may be provided as a module in the power flow path between internal combustion engine system 142 and transmission system 124. As another example, electric machine system 140 may be integrated within transmission system 124.

Electrical accumulator system 126 may include one or more batteries, capacitors, etc. for storing electrical energy. Electric machine system 140 is coupled to electrical accumulator system 126 and may be selectively operable to charge electrical accumulator system 126 when operating as a generator and to draw electrical power from electrical accumulator system 126 to propel passenger vehicle 100 when operating as a motor.

A braking system (not shown) is operable to decelerate passenger vehicle 100. For instance, the braking system may include friction brakes configured to selectively reduce the rotational velocity of wheels 116. The braking system may also be configured to as a regenerative braking system that converts kinetic energy of wheels 116 into electric current. Operation of motor system 122, transmission system 124, electrical accumulator system 126, and the braking system are well known to those skilled in the art and not described in extensive detail herein for the sake of brevity.

Figure 3:
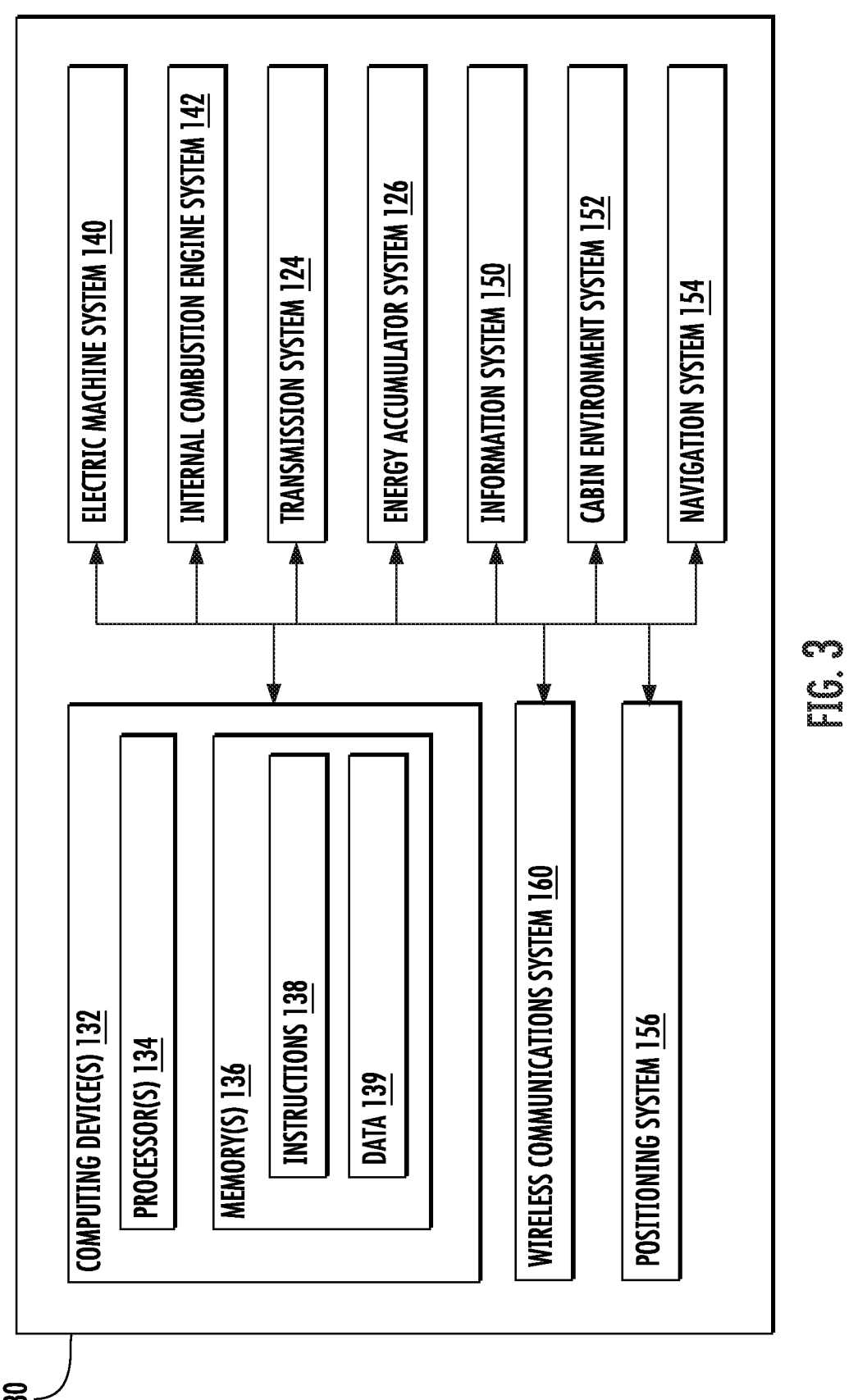
FIG. 3 is a schematic view of an example control system of the vehicle of FIG. 1 according to an example arrangement of the present subject matter.

FIG. 3 is a schematic view of certain components of a control system 130 suitable for use with passenger vehicle 100. In general, control system 130 is configured to control operation of passenger vehicle 100 and components therein. Control system 130 may facilitate operation of passenger vehicle 100 in various operating modes. For instance, control system 130 may be configured to operate passenger vehicle 100 in any one of a conventional mode, an electric mode, a hybrid mode, and a regeneration mode. In the conventional mode, passenger vehicle 100 is propelled only by internal combustion engine system 142. Conversely, passenger vehicle 100 is propelled only by electrical machine system 140 in the electric mode. The conventional mode may provide passenger vehicle 100 with an extended operating range relative to the electric mode, and passenger vehicle 100 may be quickly refilled at a fueling station to allow continued operation of passenger vehicle 100 in the conventional mode. Conversely, the emissions of passenger vehicle 100 may be significantly reduced in the electric mode relative to the conventional mode, and a fuel efficiency of passenger vehicle 100 may increase significantly in the electric mode as compared to the conventional mode. In the hybrid mode, passenger vehicle 100 may be propelled by both electrical machine system 140 and internal combustion engine system 142. In the regeneration mode, electrical machine system 140 may charge electrical accumulator system 126, e.g., and internal combustion engine system 142 may propel passenger vehicle 100. The various operating modes of passenger vehicle 100 are well known to those skilled in the art and not described in extensive detail herein for the sake of brevity.

As shown in FIG. 3, control system 130 includes one or more computing devices 132 with one or more processors 134 and one or more memory devices 136 (hereinafter referred to as "memories 136"). In certain example arrangements, control system 130 may correspond to an electronic control unit (ECU) of passenger vehicle 100. The one or more memories 136 stores information accessible by the one or more processors 134, including instructions 138 that may be executed and data 139 usable by the one or more processors 134. The one or more memories 136 may be of any type capable of storing information accessible by the one or more processors 134, including a computing device-readable medium. The memory is a non-transitory medium, such as a hard-drive, memory card, optical disk, solid-state, tape memory, or the like. The one or more memories 136 may include different combinations of the foregoing, whereby different portions of the instructions and data are stored on different types of media. The one or more processor 134 may be any conventional processors, such as commercially available CPUs. Alternatively, the one or more processors 134 may be a dedicated device, such as an ASIC or other hardware-based processor.

Instructions 138 may be any set of instructions to be executed directly (such as machine code) or indirectly (such as scripts) by the one or more processors 134. For example, the instructions 138 may be stored as computing device code on the computing device-readable medium of the one or more memories 136. In that regard, the terms "instructions" and "programs" may be used interchangeably herein. Instructions 138 may be stored in object code format for direct processing by the processor or in any other computing device language, including scripts or collections of independent source code modules that are interpreted on demand or compiled in advance. Data 139 may be retrieved, stored, or modified by the one or more processors 134 in accordance with the instructions 138. For instance, data 139 of the one or more memories 136 may store information from sensors of various systems of passenger vehicle 100, including motor system 122 (e.g., electrical machine system 140 and internal combustion engine system 142), transmission system 124, electrical accumulator system 126, etc. In FIG. 3, the processor(s) 134, memory(ies) 136, and other elements of computing device(s) 132 are shown within the same block. However, computing device(s) 132 may actually include multiple processors, computing devices, and/or memories that may or may not be stored within a common physical housing. Similarly, the one or more memories 136 may be a hard drive or other storage media located in a housing different from that of the processor(s) 134. Accordingly, computing device(s) 132 will be understood to include a collection of processor(s) and one or more memories that may or may not operate in parallel.

Computing device(s) 132 may be configured for communicating with various components of passenger vehicle 100. For example, computing device(s) 132 may be in operative communication with various systems of passenger vehicle 100, including motor system 122 (e.g., electrical machine system 140 and internal combustion engine system 142), transmission system 124, electrical accumulator system 126, etc. For instance, computing device(s) 132 may particularly be in operative communication with an engine control unit (ECU) (not shown) of motor system 122 and a transmission control unit (TCU) (not shown) of transmission system 124. Computing device(s) 132 may also be in operative communication with other systems of passenger vehicle 100, including a passenger/driver information system 150, e.g., that includes one or mode display(s), speaker(s), gauge(s), etc. within interior cabin 112 for providing information regarding operation of passenger vehicle 100 to a passenger/driver, a cabin environment system 152 for modifying the temperature of interior cabin 112, e.g., via air conditioning, heating, etc., a navigation system 154 for navigating passenger vehicle 100 to a destination, and/or a positioning system 156 for determining a current location (e.g., GPS coordinates) of passenger vehicle 100. Computing device(s) 132 may be configured to control system(s) 122, 124, 126 based at least in part on inputs received from an operator via a user interface (not shown), which may include one or more of a steering wheel, a gas pedal, a clutch pedal, a brake pedal, turn signal lever, hazard light switch, and/or the like.

Control system 130 may also include a wireless communication system 160 assists with wireless communication with other systems. For instance, wireless communication system 160 may wirelessly connect control system 130 with one or more other vehicles, buildings, etc. directly or via a communication network. Wireless communication system 160 may include an antenna and a chipset configured to communicate according to one or more wireless communication protocols, such as Bluetooth, communication protocols described in IEEE 802.11, GSM, CDMA, UMTS, EV-DO, WiMAX, LTE, Zigbee, dedicated short range communications (DSRC), radio frequency identification (RFID) communications, etc. It should be appreciated that the internal communication between the computing device(s) 132 and the system(s) 122, 124, 126, 140, 142 within passenger vehicle 100 may be wired and/or wireless. As a particular example, systems within passenger vehicle 100 may be connected and communicate via a CAN bus.

As shown in FIG. 1, passenger vehicle 100 may include a front camera 158 and a rear camera 159. Front camera 158 may be a component of an advanced driver assistance system (ADAS) of passenger vehicle 100. For example, front camera 158 may be oriented on body 110 along a forward direction of travel. Thus, front camera 158 may capture image(s) of an area in front of passenger vehicle 100 during travel. For instance, front camera 158 may capture image(s) of vehicles in front of passenger vehicle 100 during travel, and image(s) from front camera 158 may be utilized for adaptive cruise control, forward collision warning, etc. Rear camera 159 may be a backup camera for passenger vehicle 100. For example, rear camera 159 may be oriented on body 110 along a reverse direction of travel. Thus, rear camera 159 may capture image(s) of an area behind the passenger vehicle 100 during travel. For instance, rear camera 159 may capture image(s) of vehicles or pedestrians behind passenger vehicle 100 during travel, and image(s) from rear camera 159 may be presented on a display of driver information system 150 so that the driver of passenger vehicle 100 may utilize such images during reverse travel of passenger vehicle 100.

Passenger vehicle 100 may also include other cameras, such as side view cameras to facilitate lane changes of the passenger vehicle 100. Passenger vehicle 100 may also include one or more image sensors 157, such as lidar or radar sensors, that are configured to generate images of objects, including other vehicles, proximate the passenger vehicle 100.

Figure 4:
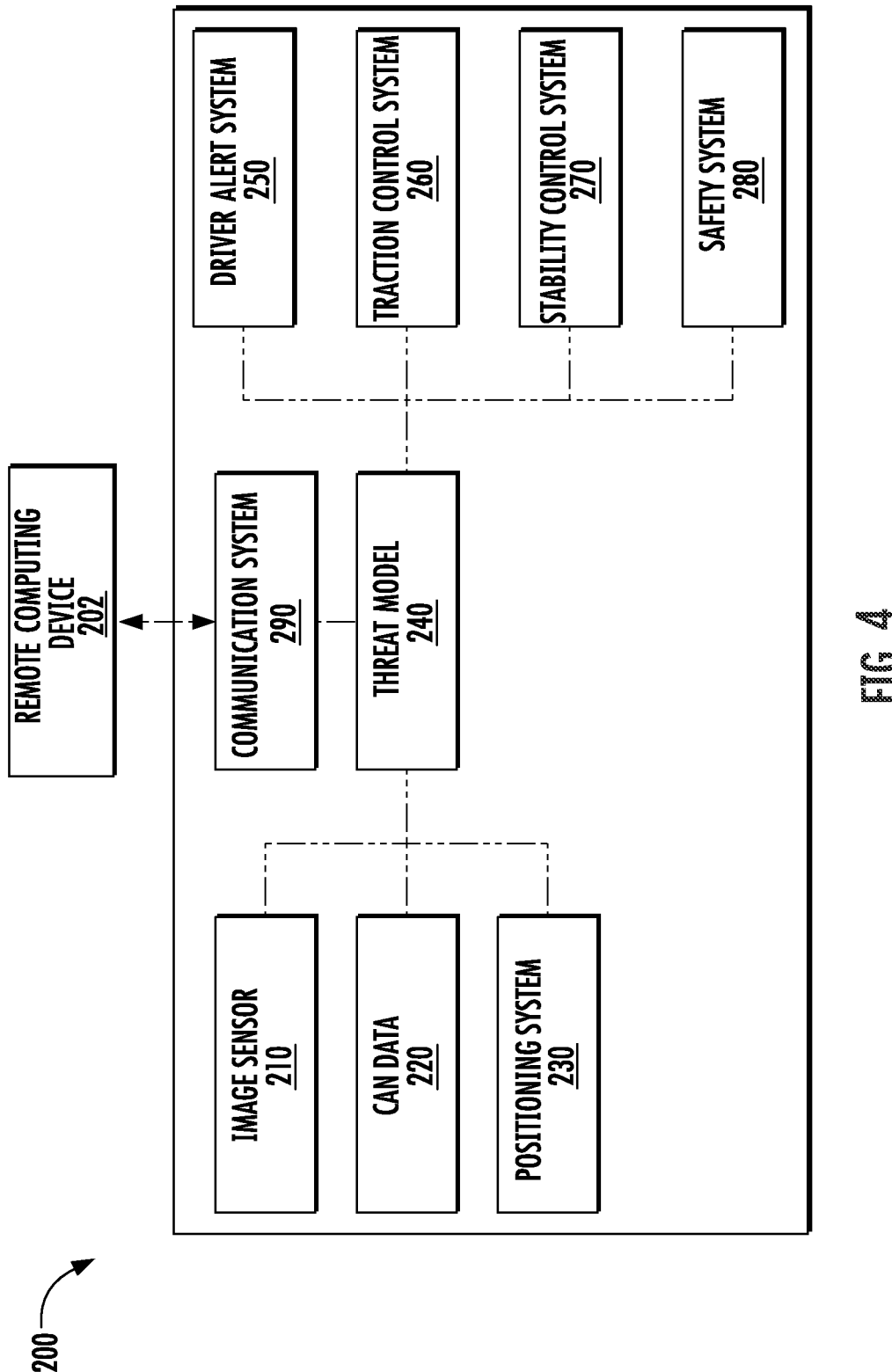
FIG. 4 is a block diagram view of certain components of a threat identification system according to an example arrangement of the present subject matter.

Turning now to FIG. 4, the passenger vehicle 100 may also include features for detecting threats for passenger vehicle 100. Moreover, FIG. 4 is a block diagram of a process for a threat identification system 200 of passenger vehicle 100 according to an example arrangement of the present subject matter. As an example, the process of the threat identification system 200 may be implemented on control system 130 via processors 134 such that process is performed at the edge or on passenger vehicle 100.

The threat identification system 200 of passenger vehicle 100 may utilize images from sensors, such as one or more of the image sensor 157, the front camera 158, rear camera 159, to detect and identify threats that pose an accident risk for the passenger vehicle 100. Moreover, the threat identification system 200 may utilize images of other vehicles to identify and classify risky behavior of the other vehicles, such as aggressive driving, changing lanes without signal, cutting off, tailgating, dropping cargo, spinning out of control, inability to hold the lane, etc. When risky behavior is identified, the threat identification system 200 may compute a threat reduction action for the passenger vehicle as a response to the risky behavior and/or may present a threat alert to a driver of the passenger vehicle 100. In example arrangements, the threat identification system 200 may automatically implement the threat reduction action, e.g., in order to protect occupants of the passenger vehicle 100 and/or reduce the accident risk posed by the other vehicle(s) around the passenger vehicle 100. The threat detection system 200 may also transmit the threat alert to a remote computing device located outside the vehicle, which can update a map with the threat and/or send the threat alert to nearby vehicles to inform the nearby vehicles of the risky behavior.

The threat identification system 200 may be configured as part of the control system 130 of the passenger vehicle 100 in certain example arrangements. Thus, e.g., the computing devices 132 may be programmed to implement the threat identification system 200 in certain example arrangements. It will be understood that the threat identification system 200 may be used in or with any suitable vehicle. Thus, while described below in the context of the passenger vehicle 100, the threat identification system 200 may be used in or with a car, a bus, a truck, a van, or any other vehicle that travels on a roadway. As noted above, the threat identification system 200 may advantageously identify risky behavior of other vehicles based at least in part on images taken by sensors on the vehicle with the threat identification system 200.

With reference to FIG. 4, the threat identification system 200 may include or be communication with an image sensor 210, which is configured for generating data corresponding to images of one or more other vehicles around the passenger vehicle 100. As an example, the image sensor 210 may include one or more of the image sensor 157, the front camera 158, rear camera 159. Thus, e.g., the images from the image sensor 210 may be a picture or video from the front camera 158, a picture or video from the rear camera 159, or a lidar or radar image from the image sensor 157. The threat identification system 200 on the passenger vehicle 100 may thus generate or receive data corresponding to images of other vehicles from the image sensor 210.

The threat identification system 200 may also include a controller area network (CAN) bus 220 and a positioning system 230. The CAN bus 220 may be configured for accessing data from and communicating with various systems of the passenger vehicle 100. For example, the threat identification system 200 may communicate with, including receiving data from, various systems of passenger vehicle 100, such as motor system 122 (e.g., electrical machine system 140 and internal combustion engine system 142), transmission system 124, electrical accumulator system 126, etc. via the CAN bus 220. The positioning system 230, which may correspond to the positioning system 156, may be configured for determining a current location (e.g., GPS coordinates) of the passenger vehicle 100.

The threat identification system 200 may also include a threat identification model 240. The threat identification model 240 may include a machine-learned model configured to identify threats based at least in part on the images from the image sensor 210. As an example, the threat identification model 240 may utilize convolutional neural networks or other machine-learning detection algorithms trained (e.g., supervised first and unsupervised later) to recognize, detect, or identify behavior in the images of the other vehicles from the image sensor 210 and categorize the behavior of the other vehicles as risky. For instance, the threat identification model 240 may compute a threat estimate for the other vehicles based on data from the image sensor 210. The threat estimate may correspond to a likelihood calculated by the machine-learned model that the other vehicle(s) will collide with the passenger vehicle 100 or otherwise potentially cause an accident.

The threat identification model 240 may be trained using a training dataset determined using information describing previous threats. The training dataset may include one or more positive samples, with each positive sample representing a threating vehicle behavior. The threating vehicle behavior may include one or more of changing lanes without indication, speeding, tailgating, swerving, spinning, driving on a flat tire, driving on a spare tire, a collision by the one or more other vehicles, and unstable cargo. The threating vehicle behavior may also include driver behavior inside the other vehicle(s), such as texting, eating, arguing, distracted driving, etc. Thus, the machine-learned model of the threat identification model 240 may be trained to identify the threating vehicle behavior in images from the image sensor 210.

The threat identification model 240 may also compute a threat reduction action for the passenger vehicle alert, e.g., when the threat identification model 240 identifies risky behavior by other vehicles around the passenger vehicle 100 from the images of the image sensor 210. The threat reduction action may correspond to an action, which can be automatically implemented by the control system 130 or by the driver of the passenger vehicle 100, to avoid or reduce the threat posed by the other vehicle(s) exhibiting the risky behavior. The threat identification model 240 may generate the threat reduction action when a threat estimate for the other vehicle(s) exceeds a threshold value, which can be selected depending upon the desired risk tolerance. The threat estimate may correspond to a calculated likelihood that an accident will occur because of the risky behavior by other vehicles around the passenger vehicle 100 identified by the threat identification model 240. The threat reduction action may be presented on a display to the driver of the passenger vehicle 100, e.g., such that the driver can implement the threat reduction action and/or may be automatically implemented by the control system 130, as described in greater detail below.

The threat identification system 200 may also include a driver alert system 250. The driver alert system 250 may generate a driver alert, e.g., when the threat identification model 240 identifies risky behavior by other vehicles around the passenger vehicle 100 from the images of the image sensor 210. For instance, the driver alert system 250 may generate the driver alert when the threat estimate for the other vehicle(s) exceeds the threshold value, which can be selected depending upon the desired risk tolerance. The driver alert system 250 may present the driver alert on the information system 150, e.g., to inform the driver of the passenger vehicle of the risky behavior by other vehicle(s) around the passenger vehicle 100 and/or inform the driver of the threat reduction action to avoid or reduce the threat posed by the other vehicle(s) exhibiting the risky behavior. Thus, e.g., the driver may adjust operation of the passenger vehicle 100 to avoid the risky behavior. For example, the driver may pull over, slow down, change lanes, or otherwise adjust operation of the passenger vehicle 100 in response to the driver alert.

The threat identification system 200 may also include features for automatically adjusting operation of the passenger vehicle 100 in response to the risky behavior by other vehicles around the passenger vehicle 100. For instance, the threat identification system 200 may automatically adjust operation of the passenger vehicle 100 when the threat estimate for the other vehicle(s) exceeds the threshold value, which can be selected depending upon the desired risk tolerance. Thus, e.g., the control system 130 may automatically adjust operation of the passenger vehicle 100 to avoid the risky behavior, such as by pulling over, slowing down, changing lanes, or otherwise adjusting operation of the passenger vehicle 100. Moreover, the control system 130 may automatically perform one or more of the following: reduce a speed of the passenger vehicle 100, e.g., by actuating a braking system or decreasing a cruise control setting; steering the passenger vehicle 100 away from the other vehicle(s); tightening seat belts of the passenger vehicle 100 via a safety system 280; adjusting a ride height of the passenger vehicle 100 via a stability control system 270; flashing lights of the passenger vehicle 100; and adjusting the braking system, e.g., to position a brake pad closer to a rotor disc of the braking system via a traction control system 260. Other adjustments to operation of the passenger vehicle 100 may also be automatically implemented in response to the risky behavior by other vehicle(s) around the passenger vehicle 100. As may be seen from the above, the control system 130 may adjust operation of the passenger vehicle 100 to avoid risky behavior, e.g., by one of the following: avoid-by-stopping; avoid-by-passing-by; go through; etc.

The threat identification system 200 may also include features for transmitting the threat alert to other computing devices located offboard the passenger vehicle 100. For example, the threat identification system 200 may include a communication system 290 configured for transmitting data with other computing devices, such as a remote computing device 202 located separately from the passenger vehicle 100. In example arrangements, the communication system 290 may include or correspond to the wireless communication system 160. As an example, the remote computing device 202 may be a cloud server. The threat identification system 200 may be configured for transmitting data corresponding to a threat alert to the remote computing device 202, e.g., when the threat identification model 240 identifies risky behavior by other vehicles around the passenger vehicle 100 from the images of the image sensor 210, such as when the threat estimate for the other vehicle(s) exceeds the threshold value.

The remote computing device 202 may be configured for alerting other drivers about the risky behavior of the other vehicle(s) identified by the threat identification model 240. For example, the remote computing device 202 may be configured for transmitting the threat alert to other vehicles located proximate the passenger vehicle 100. Thus, the threat identification system 200 may detect risky behavior by other vehicles around the passenger vehicle 100 and transmit the detected risky behavior to the remote computing device 202. The remote computing device 202 may then transmit threat alerts to other vehicles to inform the drivers of the other vehicles of the risky behavior. Thus, e.g., the drivers of the other vehicles may also adjust operation of the other vehicles to avoid the risky behavior. For example, the drivers of the other vehicles may pull over, slow down, change lanes, or otherwise adjust operation of the other vehicles in response to the threat alert from the remote computing device 202. As another example, the remote computing device 202 may be configured for updating a map overlay with the threat alert. Thus, the drivers of other vehicles may see the risky behavior via the map overlay and take action to avoid the risky behavior.

In example arrangements, the threat identification system 200 may also include features for contacting emergency services in response to an emergency user input. For example, the driver alert system 250 may include an emergency user input with the driver alert. When the user selects the emergency user input, the communication system 290 may transmit an emergency alert for the risky behavior of the other vehicle(s) identified by the threat identification model 240. The emergency alert may include a location and identification of the other vehicle(s) as well as the risky behavior, such as speeding, swerving, spinning, unstable cargo, a collision by other vehicles, distracted driving, etc. As another example, the threat identification system 200 may initiate a phone call to emergency services, which can allow the driver of the passenger vehicle 100 to alert emergency services regarding the risky behavior of the other vehicle(s).

Figure 5:
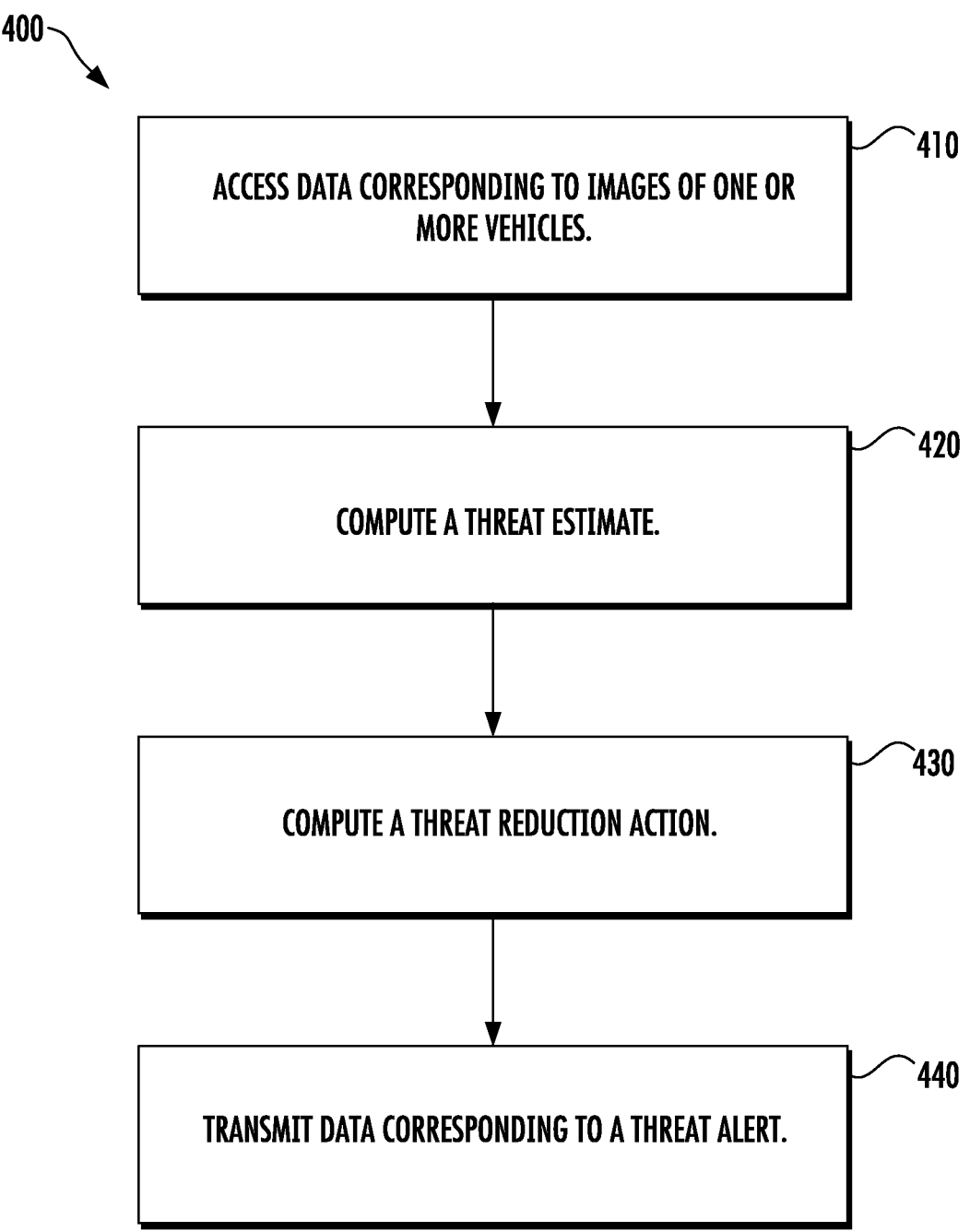
FIG. 5 is a flow diagram of a method for identifying threats according to an example arrangement of the present subject matter.

FIG. 5 is a flow diagram of a method 400 for threat detection according to an example arrangement of the present subject matter. Method 400 will generally be described with reference to passenger vehicle 100 with image sensor 157, front camera 158, and rear camera 159. For instance, method 400 may be at least partially executed by the threat identification system 200. However, method 400 may be suitable for use with any other suitable type of vehicle, control system configuration, and/or vehicle system. In addition, although FIG. 5 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 410, data corresponding to the images of one or more vehicles may be accessed. For example, an image sensor may capture an image of one or more vehicles near an ego vehicle. Moreover, image sensor 157, front camera 158, and/or rear camera 159 may capture images of one or more vehicles operating nearby the passenger vehicle 100. The control system 130 may access the data corresponding to the image(s) taken by the image sensor 157, front camera 158, and/or rear camera 159. For instance, the threat identification model 240 may access the data corresponding to the image(s) taken by the image sensor 157, front camera 158, and/or rear camera 159 at 410.

At 420, a threat estimate is computed based at least in part on the data corresponding to the images of one or more vehicles from 410. For example, the threat identification model 240 may compute the threat estimate at 420 using data corresponding to the image(s) taken by the image sensor 157, front camera 158, and/or rear camera 159 at 410. The threat identification model 240 may utilize a machine-learned model trained to identify threats to the passenger vehicle 100 in the image(s) taken by the image sensor 157, front camera 158, and/or rear camera 159, and the machine-learned model may compute the threat estimate for the other vehicles in the image(s) taken by the image sensor 157, front camera 158, and/or rear camera 159. The threat estimate may correspond to a likelihood calculated by the machine-learned model that the other vehicle(s) will collide with the passenger vehicle 100 or otherwise potentially cause an accident.

At 430, a threat reduction action may be computed, e.g., with the threat reduction action corresponding to an action that can be automatically or manually implemented to avoid or reduce the threat posed by other vehicle(s) exhibiting the risky behavior. For example, the threat identification model 240 may compute the threat reduction action when the threat identification model 240 identifies risky behavior by other vehicle(s) around the passenger vehicle 100 at 420. As noted above, the threat identification model 240 may utilize the machine-learned model trained to identify and categorize threats to the passenger vehicle 100 in the image(s) taken by the image sensor 157, front camera 158, and/or rear camera 159.

At 430, the threat identification model 240 may compute a respective threat reduction action for each threat identified at 420, and the threat identification model 240 may compute the respective threat reduction action to correspond to the category of each threat identified at 420. Thus, e.g., if the threat estimate at 420 indicates that other vehicle(s) are speeding and rapidly approaching the rear of the passenger vehicle 100, the threat reduction action may include a lane change request or command for the passenger vehicle 100. As another example if the threat estimate at 420 indicates that other vehicle(s) are swerving ahead of the passenger vehicle 100, the threat reduction action may include a brake request or command for the passenger vehicle 100 and/or flashing lights of the passenger vehicle 100. As another example, if the threat estimate at 420 indicates that other vehicle(s) are braking hard ahead of the passenger vehicle 100, the threat reduction action may include tightening seat belts of the passenger vehicle 100 and/or adjusting the ride height of the passenger vehicle 100. It will be understood that such threat reduction actions are provided by way of example and are not intended to limit the threat reduction actions to the specific examples. Other threat reduction actions may also be automatically implemented or manually implemented by the driver in response to the risky behavior by other vehicle(s) around the passenger vehicle 100.

At 430, a driver alert and/or the threat reduction action may be presented to the driver of the vehicle. For example, driver alert system 250 may present the driver alert and/or the threat reduction action on the information system 150, e.g., to inform the driver of the passenger vehicle of the risky behavior by other vehicle(s) around the passenger vehicle 100 and/or inform the driver of the threat reduction action to avoid or reduce the threat posed by the other vehicle(s) exhibiting the risky behavior. Thus, e.g., the driver may adjust operation of the passenger vehicle 100 to avoid the risky behavior. For example, the driver may pull over, slow down, change lanes, or otherwise adjust operation of the passenger vehicle 100 in response to the driver alert.

At 440, data corresponding to a threat alert may be transmitted to a remote computing device. For example, the threat identification system 200 may transmit data corresponding to the threat alert to the remote computing device 202 via the communication system 290. The threat alert may include the identity and category of the threat(s) to the passenger vehicle 100 from 420. Thus, e.g., the threat alert may include the make, model, color, location, and/or other identifying information for the other vehicle(s) exhibiting risky behavior. The threat alert may also include an image of the other vehicle(s) exhibiting risky behavior. As another example, the threat alert may also include a description of the risky behavior exhibited by the other vehicle(s), such as aggressive driving, changing lanes without signal, cutting off, tailgating, dropping cargo, spinning out of control, inability to hold the lane, etc.

The remote computing device 202 may be configured for alerting other drivers about the risky behavior of the other vehicle(s) identified by the threat identification model 240. Thus, e.g., method 400 may include transmitting the threat alert to other vehicles located proximate the passenger vehicle 100. Thus, the drivers of the other vehicles may be informed of the risky behavior by other vehicle(s) around the passenger vehicle 100 identified at 420, and the drivers of the other vehicles may take action to avoid the risky behavior. For example, the drivers of the other vehicles may pull over, slow down, change lanes, or otherwise adjust operation of the other vehicles in response to the threat alert.

As another example, method 400 may include updating a map overlay with the threat alert. Thus, the drivers of other vehicles may see the risky behavior via the map overlay and take action to avoid the risky behavior. Moreover, a map presented within the other vehicles may include the location, identity and category of the threat(s) to the passenger vehicle 100 from 420. For instance, the map may include the make, model, color, location, and/or other identifying information for the other vehicle(s) exhibiting risky behavior. As another example, the map may also include a description of the risky behavior exhibited by the other vehicle(s), such as aggressive driving, changing lanes without signal, cutting off, tailgating, dropping cargo, spinning out of control, inability to hold the lane, etc. Thus, the drivers of other vehicles may see the threat alert on the map along with information regarding the threat posed by the risky behavior such that the drivers of the other vehicles can take action to avoid the risky behavior.

In example arrangements, method 400 may also include contacting emergency services in response to an emergency user input. The communication system 290 may transmit an emergency alert for the risky behavior of the other vehicle(s) identified at 420 in response to a driver input. The emergency alert may include a location and identification of the other vehicle(s) as well as the risky behavior, such as speeding, swerving, spinning, unstable cargo, a collision by other vehicles, distracted driving, etc. As another example, the threat identification system 200 may initiate a phone call to emergency services, which can allow the driver of the passenger vehicle 100 to alert emergency services regarding the risky behavior of the other vehicle(s).

As may be seen from the above, the present subject matter may advantageously provide systems and method for identifying events and behavior by other vehicles, which can lead to potentially dangerous situations, and adjust or prepare the driver's vehicle in response to the identified risk. Moreover, the identified risk may be communicated to other vehicles to allow their driver's to also avoid the identified risk. In example arrangements, sensors of an advanced driving assistance system (ADAS) may track other vehicles to monitor the operation of the other vehicles, and risky behaviors are identified, and a threat alert may be transmitted to vehicle subsystems to prepare for the risky behavior.

This written description uses examples to disclose the present subject matter, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

EXAMPLE ARRANGEMENTS

First example arrangement: A method for identifying hazardous conditions during vehicle operation, comprising: accessing, with a computing device on an ego vehicle, data from a sensor corresponding to images of one or more other vehicles; computing, with a machine-learned model on the computing device, a threat estimate for the one or more other vehicles based at least in part on the data from the sensor; computing, with the computing device, a threat reduction action for the ego vehicle in response to the threat estimate exceeding a threshold threat level; and transmitting, with the computing device, data corresponding to a threat alert to a driver interface of the ego vehicle.

Second example arrangement: The method of the first example arrangement, wherein the sensor comprises one or more of an advanced driver assistance system camera, a radar sensor, and a lidar sensor.

Third example arrangement: The method of the first example arrangement or the second example arrangement, wherein the threat estimate corresponds to a likelihood calculated by the machine-learned model that the one or more other vehicles will collide with the ego vehicle.

Fourth example arrangement: The method of any one of the first through third example arrangements, wherein the machine-learned model has been trained using a training dataset determined using information describing previous threats, the training dataset comprising one or more positive samples, each positive sample representing a threating vehicle behavior.

Fifth example arrangement: The method of any one of the first through fourth example arrangements, wherein the threating vehicle behavior comprises one or more of changing lanes without indication, speeding, tailgating, swerving, spinning, driving on a flat tire, driving on a spare tire, distracted driving, a collision by the one or more other vehicles, and unstable cargo.

Sixth example arrangement: The method of any one of the first through fifth example arrangements, further comprising computing, with the computing device, a threat reduction action for the ego vehicle in response to the threat estimate exceeding a threshold threat level.

Seventh example arrangement: The method of any one of the first through sixth example arrangements, further comprising automatically implementing the threat reduction action, wherein the threat reduction action comprises one or more of: decreasing a speed of the ego vehicle; steering the ego vehicle away from the one or more vehicle; tightening seat belts of the ego vehicle; flashing lights of the ego vehicle; and adjusting brakes of the ego vehicle.

Eighth example arrangement: The method of any one of the first through seventh example arrangements, further comprising transmitting data corresponding to a threat alert to a remote computing device that is located off the ego vehicle.

Nineth example arrangement: The method of any one of the first through eighth example arrangements, wherein the remote computing device comprises a cloud server configured for one or both of transmitting the threat alert to other vehicles located proximate the ego vehicle and updating a map overlay with the threat alert.

Tenth example arrangement: The method of any one of the first through nineth example arrangements, wherein transmitting the data corresponding to the threat alert further comprises transmitting a location of the ego vehicle to the remote computing device.

Eleventh example arrangement: A system for identifying hazardous conditions during vehicle operation, comprising: an ego vehicle; a driver interface located on the ego vehicle; a sensor located on the ego vehicle; one or more processors located onboard the ego vehicle; and one or more non-transitory computer-readable media that store instructions that are executable by the one or more processors to perform operations, the operations comprising accessing data from the sensor corresponding to images of one or more other vehicles, computing, with a machine-learned model, a threat estimate for the one or more other vehicles based at least in part on the data from the sensor, and transmitting data corresponding to a threat alert to the driver interface.

Twelfth example arrangement: The system of the eleventh example arrangement, wherein the sensor comprises one or more of an advanced driver assistance system camera, a radar sensor, and a lidar sensor.

Thirteenth example arrangement: The system of either of the eleventh of twelfth example arrangements, wherein the threat estimate corresponds to a likelihood calculated by the machine-learned model that the one or more other vehicles will collide with the ego vehicle.

Fourteenth example arrangement: The system of any one of the eleventh through thirteenth example arrangements, wherein the machine-learned model has been trained using a training dataset determined using information describing previous threats, the training dataset comprising one or more positive samples, each positive sample representing a threating vehicle behavior.

Fifteenth example arrangement: The system of any one of the eleventh through fourteenth example arrangements, wherein the threating vehicle behavior comprises one or more of changing lanes without indication, speeding, tailgating, swerving, spinning, driving on a flat tire, driving on a spare tire, distracted driving, a collision by the one or more other vehicles, and unstable cargo.

Sixteenth example arrangement: The system of any one of the eleventh through fifteenth example arrangements, wherein the operations further comprise computing a threat reduction action for the ego vehicle in response to the threat estimate exceeding a threshold threat level.

Seventeenth example arrangement: The system of any one of the eleventh through sixteenth example arrangements, wherein the operations further comprise automatically implementing the threat reduction action, wherein the threat reduction action comprises one or more of: decreasing a speed of the ego vehicle; steering the ego vehicle away from the one or more ego vehicle; tightening seat belts of the ego vehicle; flashing lights of the ego vehicle; and adjusting brakes of the ego vehicle.

Eighteenth example arrangement: The system of any one of the eleventh through seventeenth example arrangements, wherein the operations further comprise transmitting data corresponding to the threat alert to a remote computing device that is located off the ego vehicle.

Nineteenth example arrangement: The system of any one of the eleventh through eighteenth example arrangements, wherein the remote computing device comprises a cloud server configured for one or both of transmitting the threat alert to other vehicles located proximate the ego vehicle and updating a map overlay with the threat alert.

Twentieth example arrangement: The system of any one of the eleventh through nineteenth example arrangements, wherein transmitting the data corresponding to the threat alert further comprises transmitting a location of the ego vehicle to the remote computing device.

What is claimed is:

1. A method for identifying hazardous conditions during vehicle operation, comprising:

accessing, with a computing device on an ego vehicle, data from a sensor corresponding to images of one or more other vehicles;

computing, with a machine-learned model on the computing device, a threat estimate for the one or more other vehicles based at least in part on the data from the sensor, the machine-learned model has been trained using a training dataset determined using information describing previous threats representing a plurality of threating vehicle behaviors, the training dataset comprising one or more positive samples, each positive sample representing a threating vehicle behavior of the plurality of threating vehicle behaviors, the machine-learned model being configured to identify from the data from the sensor one or more threating vehicle behaviors from the plurality of vehicle behaviors and to compute the threat estimate based on the one or more threating vehicle behaviors identified; and transmitting, with the computing device, data corresponding to a threat alert to a driver interface of the ego vehicle.

2. The method of claim 1, wherein the sensor comprises one or more of an advanced driver assistance system camera, a radar sensor, and a lidar sensor.

3. The method of claim 1, wherein the threat estimate corresponds to a value calculated by the machine-learned model that the one or more other vehicles will collide with the ego vehicle.

4. The method of claim 1, wherein the plurality of threating vehicle behaviors comprise two or more of changing lanes without indication, speeding, tailgating, swerving, spinning, driving on a flat tire, driving on a spare tire, distracted driving, a collision by the one or more other vehicles, and unstable cargo.

5. The method of claim 1, further comprising computing, with the computing device, a threat reduction action for the ego vehicle in response to the threat estimate exceeding a threshold threat level.

6. The method of claim 5, further comprising automatically implementing the threat reduction action, wherein the threat reduction action comprises one or more of:

decreasing a speed of the ego vehicle;

steering the ego vehicle away from the one or more vehicle;

tightening seat belts of the ego vehicle;

flashing lights of the ego vehicle; and adjusting brakes of the ego vehicle.

7. The method of claim 1, further comprising transmitting data corresponding to a threat alert to a remote computing device that is located off the ego vehicle.

8. The method of claim 7, wherein the remote computing device comprises a cloud server configured for one or both of transmitting the threat alert to other vehicles located proximate the ego vehicle and updating a map overlay with the threat alert.

9. The method of claim 7, wherein transmitting the data corresponding to the threat alert further comprises transmitting a location of the ego vehicle to the remote computing device.

10. A system for identifying hazardous conditions during vehicle operation, comprising:

an ego vehicle;

a driver interface located on the ego vehicle;

a sensor located on the ego vehicle;

one or more processors located onboard the ego vehicle; and one or more non-transitory computer-readable media that store instructions that are executable by the one or more processors to perform operations, the operations comprising accessing data from the sensor corresponding to images of one or more other vehicles, computing, with a machine-learned model, a threat estimate for the one or more other vehicles based at least in part on the data from the sensor, the machine-learned model has been trained using a training dataset determined using information describing previous threats representing a plurality of threating vehicle behaviors, the training dataset comprising one or more positive samples each positive sample representing a threating vehicle behavior of the plurality of threating vehicle behaviors, the machine-learned model being configured to identify from the data from the sensor one or more threating vehicle behaviors from the plurality of vehicle behaviors and to compute the threat estimate based on the one or more threating vehicle behaviors identified, and transmitting data corresponding to a threat alert to the driver interface.

11. The system of claim 10, wherein the sensor comprises one or more of an advanced driver assistance system camera, a radar sensor, and a lidar sensor.

12. The system of claim 10, wherein the threat estimate corresponds to a value calculated by the machine-learned model that the one or more other vehicles will collide with the ego vehicle.

13. The system of claim 10, wherein the plurality of threating vehicle behaviors comprise two or more of changing lanes without indication, speeding, tailgating, swerving, spinning, driving on a flat tire, driving on a spare tire, distracted driving, a collision by the one or more other vehicles, and unstable cargo.

14. The system of claim 10, wherein the operations further comprise computing a threat reduction action for the ego vehicle in response to the threat estimate exceeding a threshold threat level.

15. The system of claim 14, wherein the operations further comprise automatically implementing the threat reduction action, wherein the threat reduction action comprises one or more of:

decreasing a speed of the ego vehicle;

steering the ego vehicle away from the one or more vehicle;

tightening seat belts of the ego vehicle;

flashing lights of the ego vehicle; and adjusting brakes of the ego vehicle.

16. The system of claim 10, wherein the operations further comprise transmitting data corresponding to the threat alert to a remote computing device that is located off the ego vehicle.

17. The system of claim 16, wherein the remote computing device comprises a cloud server configured for one or both of transmitting the threat alert to other vehicles located proximate the ego vehicle and updating a map overlay with the threat alert.

18. The system of claim 16, wherein transmitting the data corresponding to the threat alert further comprises transmitting a location of the ego vehicle to the remote computing device.

* * * * *